US010042690B2

(12) United States Patent
Kurian et al.

(10) Patent No.: US 10,042,690 B2
(45) Date of Patent: Aug. 7, 2018

(54) SYSTEM FOR DETERMINATION AND NOTIFICATION OF ISSUES IN DATA FILE TRANSMISSIONS

(71) Applicant: BANK OF AMERICA CORPORATION, Charlotte, NC (US)

(72) Inventors: Manu Jacob Kurian, Dallas, TX (US); Paul Grayson Roscoe, Chester (GB)

(73) Assignee: BANK OF AMERICA CORPORATION, Charlotte, NC (US)

( * ) Notice: Subject to any disclaimer, the term of this patent is extended or adjusted under 35 U.S.C. 154(b) by 65 days.

(21) Appl. No.: 14/986,818

(22) Filed: Jan. 4, 2016

(65) Prior Publication Data
US 2017/0192839 A1 Jul. 6, 2017

(51) Int. Cl.
G06F 11/00 (2006.01)
G06F 11/07 (2006.01)
G06F 11/30 (2006.01)

(52) U.S. Cl.
CPC ...... *G06F 11/0772* (2013.01); *G06F 11/0709* (2013.01); *G06F 11/0751* (2013.01); *G06F 11/30* (2013.01)

(58) Field of Classification Search
CPC .................................................. G06F 11/0772
USPC ....... 714/57, 46, 47.1, 47.2, 37, 38.1, 48, 49
See application file for complete search history.

(56) References Cited

U.S. PATENT DOCUMENTS

| 7,949,931 B2 * | 5/2011 | Lastras-Montano ............... G06F 11/1044 714/768 |
| 8,200,623 B2 * | 6/2012 | Liu .................... G06F 17/30174 707/610 |
| 8,555,116 B1 * | 10/2013 | Shaeffer .............. G06F 11/1004 714/52 |
| 8,982,145 B2 * | 3/2015 | Hernandez ................ G06F 8/38 345/581 |
| 2004/0078171 A1 * | 4/2004 | Wegerich ........... G05B 23/0254 702/188 |
| 2014/0165204 A1 * | 6/2014 | Williams ................ G06F 21/55 726/25 |

\* cited by examiner

*Primary Examiner* — Dieu-Minh Le
(74) *Attorney, Agent, or Firm* — Michael A. Springs; Moore & Van Allen PLLC; James C. Edwards (57) ABSTRACT

The present invention provides for monitoring data file transmissions to determine patterns in data file transmissions and determining issues in a current data file transmission by comparing information associated with the patterns to attributes associated with the current data file transmission. In response to determining issues, dynamic alerts are generated and communicated to designated parties that notify the designated parties of the issues and prompt remedial actions. The present invention is able to monitor events that occur prior to data transmission (i.e., pipeline events) and, when such events are determined, through comparison of the patterns of attributes, to be abnormal or identify a fault, alerts may be generated and actions taken to eliminate or lessen the delay in the subsequent data transmission (i.e., adhere to predetermined data transmission timing requirements).

20 Claims, 4 Drawing Sheets

SYSTEM FOR DETERMINATION AND NOTIFICATION OF ISSUES IN DATA FILE TRANSMISSIONS

FIELD

In general, embodiments of the invention relate to transmission of data files in computing networks and, more particularly, systems and the like for monitoring data file transmissions to determine patterns in data file transmissions and determining issues in a current data file transmission by comparing information associated with the patterns to attributes associated with the current data file transmission. In response to determining issues, dynamic alerts are generated and communicated to designated parties that notify the designated parties of the issues and prompt remedial actions.

BACKGROUND

In many instances, transmission and receipt of data files is conducted on a regular basis. For example, one entity (e.g., an enterprise) may transmit a certain data file to another entity (e.g., a client or vendor of the enterprise) on a predetermined schedule, such as on predetermined days of the week or daily and at a predetermined time within a day. The data file may include critical data items that are required to be received by the recipient entity in accordance with the predetermined schedule in order for the recipient entity to conduct a time-sensitive activity or process associated with the data items. However, due to the complexity of the data files and tight time windows for pre-processing and preparing the data files, it is not uncommon for a data file to be delayed in transmission or receipt or, in some instances, fail to be transmitted or received altogether.

Current systems are reactive in terms of measures that are taken in the event that a data file is delayed in transmission and/or receipt, or fails to transmit and/or be received. In this regard, current systems may determine that a data file should have already been received and, in response to determining such, issue alerts to designated parties that can ascertain the reason for delay and/or failure and, when possible, take appropriate remedial action. However, current systems are not in place to predict a delay in transmission/receipt of a data file or a failure to transmit/receive a data file and, respond accordingly, i.e., notify designate entities that may be able to prevent the delay/failure or identify and implement remedial actions before the delay occurs or increases or before the failure occurs.

Therefore, a need exists to develop systems, apparatus, methodologies and the like for determining issues associated with current transmissions of data files that may prevent or delay the data file from being received by a designated recipient entity and providing notification of the issues to designated entities within the sender entity and/or the recipient entity. In addition, a need exists to track such issues to identify patterns of issues such that remedial actions can be taken to prevent a reoccurrence of an issue.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for determining issues related to current data file transmissions and, in response to determining an issue, notifying designated entities of the issue so that proper remedial actions may occur.

Specifically, the present invention provides for monitoring data file transmission to heuristically or otherwise identify patterns in data file transmissions The patterns may include, but are not limited to, the timing parameters associated with different events for a specified recurring data file transmission (e.g., a data file transmission that occurs daily or the like and, in some instances, at a specified time during the day). In addition, the monitoring of data file transmissions provides for identifying trends in data file transmissions (e.g., increases or decreases in timing associated with transmission or receipt of a recurring data file transmission), so that preventive measures can be taken to prevent future issues and/or reallocate resources based on the trends.

In addition, the present invention provides for determining issues, such as, timing issues or the like for a current data file transmission based on a comparison of the information associated with identified patterns and attributes associated with the current data file transmission. For example, the identified pattern may indicate that a certain pre-processing event should occur prior to transmission of a specified data file or the normal length of time for that pre-processing event to occur and, if the event has not occurred or is taking too much time to occur, an issue may be determined with the current transmission of the data file.

Moreover, the present invention provides for generating and communicating alerts to designated sender entities and/or recipient entities in response to determination of an issue. In accordance with specific embodiments of the invention the alerts may be intelligently configured and communicated, such that (i) the timing of communication of the alerts takes into account who the recipient is, the severity of the issue (e.g., the length of delay in transmission/receipt), (ii) who the recipients should be based on the type and/or severity of the issue, and (iii) what the content of the alert should include based on the type and/or severity of the issue and who the designated recipient is.

In this regard the present invention is capable of identifying issues that may occur prior to the transmission of the data file (e.g., issues associated with assembling the data file or pre-processing of the data file) and may generate and communicate alerts to designated entities prior to a scheduled transmission or receipt time, so that proactive remedial actions may occur to correct or mitigate the issue even before the data file is scheduled to transmitted or received.

An apparatus for determining one or more issues associated with data file transmissions and generating alerts in response to determining an issue defines first embodiments of the invention. The apparatus, which may comprise one or more computing devices, includes a computing platform having a memory and at least one processor in communication with the memory. Further, the apparatus includes a data file transmission monitoring module that is stored in the memory and executable by the processor. The monitoring module is configured to monitor data file transmissions to identify, typically using heuristics or the like, patterns in the data file transmissions. In specific embodiments of the invention, the patterns define timing parameters associated with different events for a specified recurring data file transmission.

The apparatus further includes an issue determining module that is stored in the memory and executable by the processor. The issue determining module is configured to determine one or more issues associated with a current transmission of a data file based on comparison of information associated with at least one of the identified patterns to attributes of the current transmission of the data file. In specific embodiments the issue determining module is configured to determine one or more issues associated with timing of the current transmission of the data file that may delay or prohibit the data file from being transmitted to or received by the designated entity. In other specific embodiments of the invention, the issue determining module is configured to determine one or more issues associated with pre-processing of the data file prior to transmission of the data file, the pre-processing may include, but is not limited to assembling the data file from one or more sources, creating a temporary data file or the like.

Additionally, the apparatus includes an alert module that is stored in the memory and executable by the processor. The alert module is configured to generate and initiate communication of one or more alerts in response to the issue determining module determining an issue with the current data file transmission. The alerts serve to notify at least one of the recipient entity or the sender entity of the issue and prompt remedial actions. In specific embodiments of the apparatus, the alert module is further configured to generate and initiate communication one or more alerts prior to a scheduled time for receipt or transmission of the data file or after the scheduled time for receipt or transmission of the data file. In other specific embodiments of the apparatus, the alert module is further configured to generate and initiate communication of one or more alerts prior to a scheduled time for transmission or receipt of the data file based on determining issues associated with the pre-processing of the data file.

In further specific embodiments of the apparatus, the alert module is further configured to progressively generate and initiate communication of the one or more alerts to different levels of recipients within a sender entity or a recipient entity. Each level is associated with one of (i) a longer period of delay in transmitting or receiving the data file or (ii) failure to respond to the determined issue within a predetermined period of time by a previous alert recipient.

Moreover, further specific embodiments of the apparatus provide for the alert module to dynamically determine a timing and for generating and initiating communication of the one or more alerts and/or content to be included in the alerts(s) based on at least one of (i) a type of issue associated with the current transmission of the data file and (ii) a designated recipient of one of the alerts. In other related embodiments of the apparatus, the alert module is further configured to determine one or more recipients for receiving the alerts based on at least one of (i) a type of issue associated with the current transmission of a data file that may prevent or delay the data file from being received by a designated entity and (ii) a length in delay in transmitting or receiving the data file.

In other specific embodiments of the apparatus, the alert module is further configured to generate and initiate communication of the one or more alerts, wherein at least one of the alerts notifies the recipient entity or the sender entity of an alternative time for scheduling transmission of future data file transmissions.

A method for determining one or more issues associated with data file transmissions and generating alerts in response to determining the issue defines second embodiments of the invention. The method includes monitoring, by a computing device processor, data file transmissions to identify patterns in the data file transmissions. In addition, the method includes determining, by a computing processor, one or more issues associated with a current transmission of a data file based on comparison of information associated with at least one of the identified patterns to attributes of the current transmission of the data file. Additionally the method includes generating and initiating communication, by a computing device processor, of one or more alerts in response to determining an issue with the current transmission, wherein the alerts notify at least one of the recipient entity or the sender entity of the issue.

In specific embodiments of the method determining the one or more issues further includes determining, by the computing device processor, one or more issues associated with pre-processing of the data file prior to transmission of the data file. In such embodiments of the invention, pre-processing may include, but is not limited to, assembling the data file or creating a temporary version of the data file prior to transmission of the data file. In further related embodiments of the method generating and initiating communication of the alert further includes generating and initiating communication, by the computing device processor, of one or more alerts prior to a scheduled time for transmission or receipt of the data file based on determining issues associated with the pre-processing of the data file.

In other specific embodiments of the method determining the one or more issues further includes determining, by the computing device processor, one or more issues associated with timing of the current transmission of the data file that may delay the data file from being transmitted to or received by the designated entity within a predetermined schedule time for transmission or receipt of the data file.

A computer program product including a non-transitory computer-readable medium defines third embodiments of the invention. The computer-readable medium includes a first set of codes for causing a computer to monitor data file transmissions to identify patterns in the data file transmissions. The computer-readable medium additionally includes a second set of codes for causing a computer to determine one or more issues associated with a current transmission of a data file based on comparison of information associated with at least one of the identified patterns to attributes of the current transmission of the data file. Moreover, the computer readable-medium includes a third set of codes for causing a computer to generate and initiate communication of one or more alerts in response to determining an issue with the current transmission, wherein the alerts notify at least one of the recipient entity or the sender entity of the issue.

Thus, systems, apparatus, methods, and computer program products herein described in detail below provide for monitoring data file transmissions to determine patterns in data file transmissions and determining issues in a current data file transmission by comparing information associated with the patterns to attributes associated with the current data file transmission. In response to determining issues, dynamic alerts are generated and communicated to designated parties that notify the designated parties of the issues and prompt remedial actions.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for determining issues related to current data file transmissions and, in response to determining an issue, notifying designated entities of the issue so that proper remedial actions may occur. Specifically, the present invention provides for monitoring data file transmission to heuristically or otherwise identify patterns in data file transmissions The patterns may include, but are not limited to, the timing parameters associated with different events for a specified recurring data file transmission (e.g., a data file transmission that occurs daily or the like and, in some instances, at a specified time during the day). In addition, the monitoring of data file transmissions provides for identifying trends in data file transmissions (e.g., increases or decreases in timing associated with transmission or receipt of a recurring data file transmission), so that preventive measures can be taken to prevent future issues and/or reallocate resources based on the trends.

In addition, the present invention provides for determining issues, such as, timing issues or the like for a current data file transmission based on a comparison of the information associated with identified patterns and attributes associated with the current data file transmission. For example, the identified pattern may indicate that a certain pre-processing event should occur prior to transmission of a specified data file or the normal length of time for that pre-processing event to occur and, if the event has not occurred or is taking too much time to occur, an issue may be determined with the current transmission of the data file.

Moreover, the present invention provides for generating and communicating alerts to designated sender entities and/or recipient entities in response to determination of an issue. In accordance with specific embodiments of the invention the alerts may be intelligently configured and communicated, such that (i) the timing of communication of the alerts takes into account who the recipient is, the severity of the issue (e.g., the length of delay in transmission/receipt), (ii) who the recipients should be based on the type and/or severity of the issue, and (iii) what the content of the alert should include based on the type and/or severity of the issue and who the designated recipient is.

In this regard the present invention is capable of identifying issues that may occur prior to the transmission of the data file (e.g., issues associated with assembling the data file or pre-processing of the data file) and may generate and communicate alerts to designated entities prior to a scheduled transmission or receipt time, so that proactive remedial actions may occur to correct or mitigate the issue even before the data file is scheduled to transmitted or received.

Figure 1:
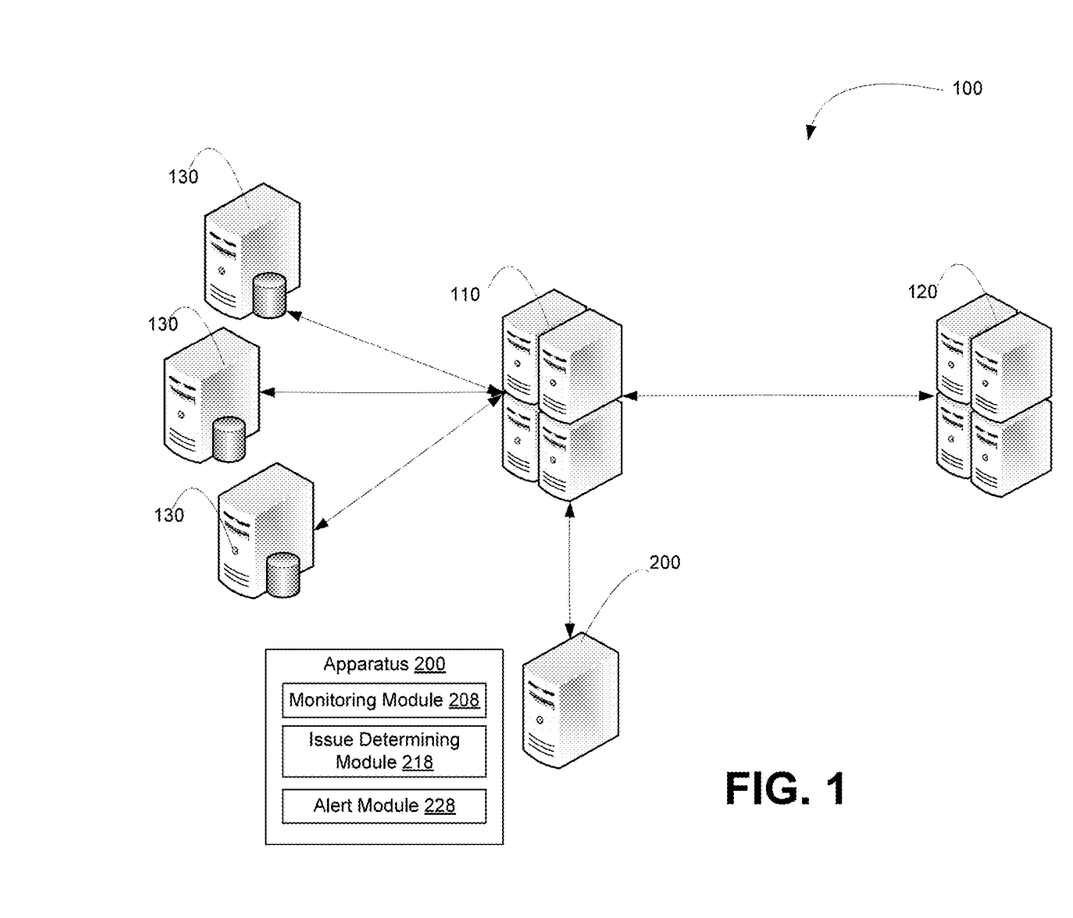
FIG. 1 provides a schematic diagram of an exemplary system for data file transfer incorporating determination and notification of issues associated with the transmission of a data file; in accordance with embodiments of the present invention.

Referring to FIG. 1, a schematic diagram is provided of a system 100 for determination and notification of issues associated with data file transmissions, in accordance with embodiments of the present invention. The system 100 comprises an application server 110 that is configured to transmit data files to application server 120 across a secure network 122. Application server 110 may be disposed at a first entity, such as a large enterprise, while application server 120 may be disposed at a second entity, such as a different large enterprise. In other embodiments of the invention, both the first entity (i.e., the file sender) and the second entity (i.e., the file recipient) may reside within the same enterprise. The data files that are transmitted are typically large data files that include a large amount of data items/entries, such as line item transactions or the like and are transmitted on a regular/recurring basis, such as hourly, daily or the like. The application server 120 is responsible for all pre-processing of data files prior to transmission. Application server 120 is in network communication with database servers 130, which may store data and serves as data sources for data files. As such, each data file may comprise data from one or, in some instances, multiple different data sources. Each database server 130 may execute on different platforms (e.g., operating systems) and the data sources may rely on disparate applications, systems and the like.

System 100 includes apparatus 200, which comprises a server or any other capable computing device and is in communication with application server 110 and directly or indirectly in communication with database servers 130. Apparatus 200 executes data transmission monitoring module 208 that is configured to monitor data file transmissions, typically throughout an enterprise, to identify patterns, otherwise referred to as behaviors, associated with the data file transmissions. As such, monitoring module 208 monitors events occurring at application server 110, as well as any downstream events, such as events that may occur at database servers 130 or any devices, applications, and the like further downstream in the data transmission process. In specific embodiments of the invention the monitoring module 208 heuristically identifies and refines patterns, over time, as more and more data file transmissions are monitored. Patterns may define timing parameters associated with any event included in the data file transmission process, such as, when an event should occur, how long an event should last and the like. In addition, patterns may identify which data file transmissions are regular/recurring data file transmissions. Additionally, patterns may define other parameters associated with the data file; such as typical file type, file size and the like. Moreover, patterns may identify time-related network characteristics; such as optimal times to transmit data files based on low network usage and/or sub-optimal or undesirable times to transmit data files based on high network usage.

Apparatus 200 additionally includes issue determining module 218 that is configured to determine, using a heuristic approach or the like, issues associated with a current data file transmission based on comparison of information associated with the patterns and parameters associated with the current data file transmission. An issue as used herein is a level of deviation from a "normal" parameter, wherein the norm is defined by information in the pattern. For example, a pattern may be identified for a specified recurring data file transmission and the pattern may indicate that a certain pre-processing event (e.g., creation of a temporary file) normally occurs at a specified time (as defined in the pattern) prior to the scheduled or normal time for data file transmission. In the event that the pre-processing step does not start at the specified time or has not started within a predefined time after the specified time, the issue determining module 218 may deem the failure or delay of the preprocessing step as an "issue". Moreover, the present invention takes into account other factors, such as current network load, current upstream processing availability and the like in determining whether an issue exists. As such, no predefined level of deviation or thresholds may be set, since the degree of deviation remains dynamic in light of the other factors that are considered (e.g., a slight deviation from the norm may rise to an "issue" for one data file transmission, while a subsequent larger deviation from the norm for the same event/parameter may not rise to an "issue" for a different data file transmission.

Apparatus 200 additionally includes alert module 228 that is configured to, in response to determining an issue associated with data file transmission, generate and initiate electronic communication of an alert to one or more recipients. The recipients may be entities at the first entity (i.e., data file sender entities or individuals) and/or entities at the second entity (i.e., data file recipient entities or individuals) and/or a third-party recipient unaffiliated with the first or second entity. The alert notifies the recipient of the issue. In specific instances, alerts may be generated and communicated prior to the scheduled or normal transmission time of a data file. In this regard, the alert is pro-active and preventative in nature, since remedial actions may be taken to rectify the issue prior to the scheduled/normal transmission time; assuring that either no further delay occurs in the transmission or that the transmission occurs at the scheduled/normal transmission time. In specific embodiments of the invention, as discussed in more detail below, the alert module 228 is configured to intelligently and dynamically determine who should receive the alerts, what the content of the alert should be, the timing for the alerts and the like. It should be noted that while monitoring module 208, issue determining module 218 and alert module 228 are shown and described herein as separate modules, it is also conceivable, and within the confines of the inventive concepts, to consolidate the modules into one or two modules as need dictates.

Figure 2:
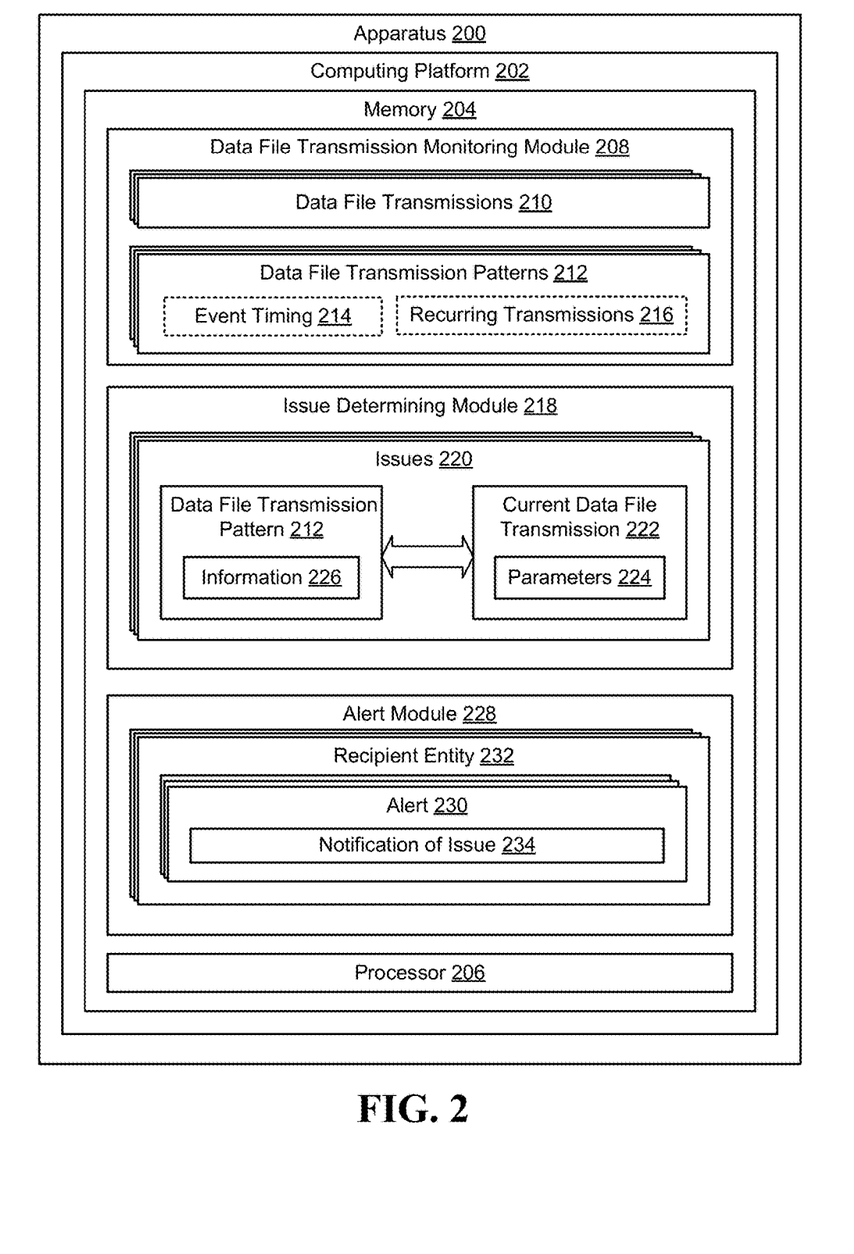
FIG. 2 provides a block diagram of an apparatus for determination and notification of issues associated with the transmission of a data file, in accordance with embodiments of the present invention.

Referring to FIG. 2 a block diagram is depicted of an apparatus 200 configured for determination and notification of issues in data file transmissions, in accordance with embodiments of the present invention. Apparatus 200 includes a computing platform 202 having a memory 204 and at least one processor 206 in communication with the memory 104. Apparatus 200 may comprise multiple devices, such as multiple servers, storage devices, personal computers and the like.

Memory 204 stores data file transmission monitoring module 208 that is configured to monitor, over time, data file transmissions 210 to identify and refine data file transmission patterns 212. A pattern may be identified heuristically or using other known techniques. As previously noted, patterns serve to define the "norm" in data file transmissions; such as, but not limited to, normal times that pre-processing (pre-transmission) events (and in some instances, post-processing (post-transmission) events) occur, normal duration of pre-processing or post-processing events, normal transmission times, and other parameters related to data file transmissions, such as, normal data file size and the like. In specific embodiments of the invention, the pattern may define a recurring data file transmission 216, such as transmission that occurs hourly, daily, weekly or on some other regular basis. In addition, such recurring date file transmissions may occur at a scheduled time of day, which may be predetermined or may be deduced from the pattern (i.e., the pattern identifies the "normal" date and/or time at which the date file is transmitted). In addition, patterns 212 may define event timing 214 associated with file transfer events. An event may be any downstream process associated with the data file transmission. As such, the event may be an event that is scheduled to occur or normally occurs just prior transmission (e.g., creation of a temp file) or the event may an event that is scheduled to occur or normally occurs hours and, in some instances days, before the transmission of the data file (e.g., production of a requisite data item, occurrence of a requisite action/transaction or the like). In addition, where applicable and feasible, the monitoring of events may include upstream events (i.e., events that occur after the date file has been transmitted but before the data file has been received).

Memory 204 of apparatus 200 additionally includes issue determining module 218 that is configured to determine, using heuristics or the like, issues 220 in current (i.e., ongoing) data file transmissions 224 (which include scheduled/planned data file transmissions) based, at least in part, on a comparison between the information 226 associated with the data file transmission pattern 212 and parameters 222 associated with the current data file transmission 224 (including a planned or scheduled data file transmission). Since both the monitoring module 208 and the issue determining module 218 involve some form of monitoring to determine conditions that affect data file transmission, it is possible, and within the inventive concepts herein disclosed, to consolidate the monitoring module 208 and the issue determining module 219 into one As previously noted, an "issue" as used herein is a level of deviation from a "normal" parameter, wherein the norm is defined by information in the pattern or other information associated with the data file transmission that is accessible to the issue determining module 218. Additionally, as previously described the issue determining module 218 may use other available information, other than the pattern information 226, to determine if an issue 220 exists, such as network load information, upstream resource availability and the like. In this regard, issues are dynamic in nature and depend upon current conditions in the network, current resource availability and the like.

In addition, memory 204 of apparatus 200 includes alert module 228 that is configured to generate and initiate communication of one or more alerts 230 that serve to notify designated recipients of the issue. In specific embodiments of the invention, the alerts 230 may be escalated based on file transfer-related event failing to occur (or taking too long to occur). Escalation of alerts, otherwise referred to herein as progressive alerts, may provide for different levels of recipients and or more frequent alerts based on continual failure of an event occurring or continual excessive duration of an event. For example, if a data file transmission is scheduled to be transmitted or received at predefined time (or a normal time as identified by a pattern) and the scheduled time has lapsed, a first alert may be initially sent to a first entity (e.g., a lower level manager), a second alert may be sent and period of time after the first alert (e.g., five minutes) to a second entity (e.g., a middle level manager) and a third alert may be sent a period of time after the second alert (e.g., five minutes) to a third entity (e.g., a high level manager or executive) and so on. In another example, if a data file transmission is scheduled to be transmitted or received at predefined time (or a normal time as identified by a pattern) and the scheduled time has lapsed, a first alert may be initially sent to a first entity, a second alert may be sent to the same first entity after a certain period of time (e.g., 5 minutes) and a third alert sent to the same first entity after a certain shorter period of time (e.g., 3 minutes) and so on. In specific embodiments of the invention, alerts continue to be progressively until a data file is transmitted and/or received or until remedial action is taken and notification is provided of such remedial action to the alert module 228.

Figure 3:
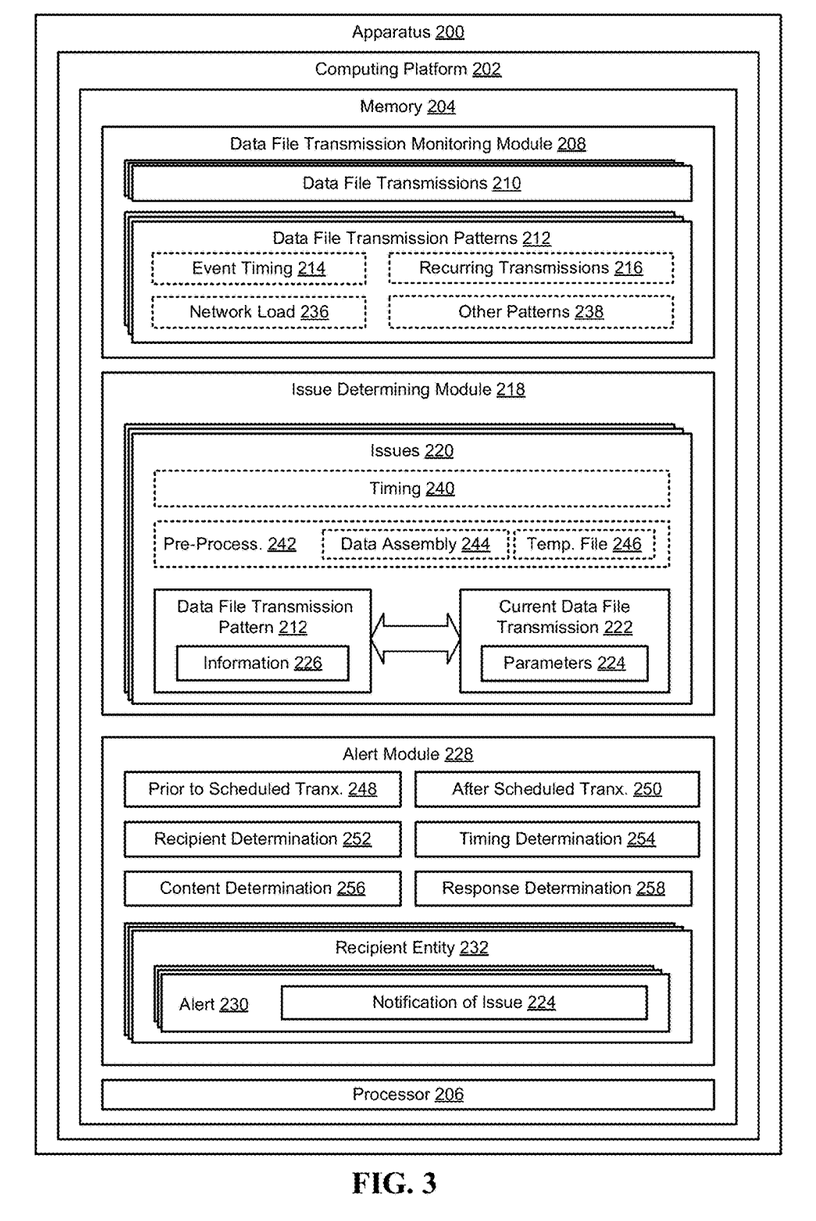
FIG. 3 provides a more detailed block diagram of an apparatus for determination and notification of issues associated with the transmission of a data file, in accordance with embodiments of the present invention.

Referring to FIG. 3 a more detailed block diagram is shown of an apparatus 200 configured for determination and notification of issues in data file transmissions, according to embodiments of the present invention. Specifically, FIG. 3 provides details of alternate embodiments of the invention. As previously described, apparatus 200, which may comprise multiple computing devices, includes a computing platform 202 having a memory 204 and at least one processor 206 in communication with the memory 204. Memory 204 may comprise volatile and non-volatile memory, such as read-only and/or random-access memory (RAM), read-only memory ROM, EPROM, EEPROM, flash cards, or any memory common to computer platforms. Further, memory 204 may include one or more flash memory cells, or may be any secondary or tertiary storage device, such as magnetic media, optical media, tape, or soft or hard disk. Moreover, memory 204 may comprise cloud storage, such as provided by a cloud storage service and/or a cloud connection service.

Further, processor 206 may be an application-specific integrated circuit ("ASIC"), or other chipset, processor, logic circuit, or other data processing device. Processor 206 or other processor such as ASIC may execute an application programming interface ("API") (not shown in FIG. 3) that interfaces with any resident programs or modules, such as data file transmission monitoring module 208, issue determining module 218 and alert module 228 and routines, sub-modules associated therewith or the like stored in memory 204 of apparatus 200. Processor 206 includes various processing subsystems (not shown in FIG. 3) embodied in hardware, firmware, software, and combinations thereof, that enable the functionality of apparatus 200 and the operability of the apparatus 200 on a network. For example, processing subsystems allow for initiating and maintaining communications and exchanging data with other networked computing platforms. For the disclosed aspects, processing subsystems of processor 206 may include any subsystem used in conjunction with data file transmission monitoring module 208, issue determining module 218 and alert module 228 and related algorithms, sub-algorithms, modules, sub-modules thereof Computer platform 202 may additionally include a communications module (not shown in FIG. 3) embodied in hardware, firmware, software, and combinations thereof, that enables communications among the various components of the computing platform 202, as well as between the other networked devices. Thus, communication analysis module may include the requisite hardware, firmware, software and/or combinations thereof for establishing and maintaining a network communication connection.

Memory 204 stores data file transmission monitoring module 208 previously briefly described in reference to FIG. 2. In accordance with embodiments of the present invention, data file transmission monitoring module 208 is configured to monitor data file transmissions 210 to identify patterns 212 in data file transmissions 210. In specific embodiments of the invention, the monitoring module 208 uses heuristic techniques or the like to identify and, over time, refine information associated with a pattern 212. A pattern 212 may be defined as any data file transmission behavior. For example, a pattern 212 may indicate event timing 214 such as a "normal" (i.e., average or the like) time at which a transmission-related event should occur (in relation to a scheduled time or the normal time (as defined by a pattern) for transmission or the normal/average duration of an event. The events may include pre-processing (i.e., pre-transmission) events, such as assembling the data file, creating temporary files prior to transmission and the like, and in some embodiments, post-transmission events. In certain instances a data file will be compiled from disparate data sources (e.g., different platforms, application, systems, protocols and the like), which may be normalized and/or reformatted prior to data file transmission 210. In accordance with embodiments of the present invention, the monitoring module 208 may be system-agnostic, platform-agnostic, application-agnostic and/or protocol-agnostic, such that the monitoring module is capable of monitoring any downstream application/service regardless of the system, platform, application or protocol implemented by the application/service.

A pattern 212 may additionally identify which data file transmissions are recurring transmissions 216. A recurring transmission is a transmission that transmitted on a regular or recurring basis, such as hourly, daily, weekly, monthly or the like. In addition to identifying the cycle of the transmission, a pattern may identify the specific time of day (hour and minute) at which the transmission normally occurs. The normal time at which a data file transmission occurs, as identified in a pattern, typically equates to or is proximate to the scheduled time for data file transmission. As previously noted, continual monitoring, over-time, will refine patterns, such that the "normal" times associated with an event or recurring transmission become more accurate/optimal over time as more transmissions are monitored.

Additionally, data file transmission monitoring module 208 may identify patterns 212 associated with network load 236, such times of day, week, month or the like at which the network load is above or below average load. Such information can beneficial in determining optimal times for scheduling recurring data file transmissions. For example, if a specified recurring data file transmissions occurs at 2 pm on Fridays and the monitoring module 2008 has determined that during that time frame the network load is heavy (i.e., significantly above average), the alert module 228 may generate and initiate communication of an alert to a designated entity that recommends alternate times for scheduling the data file transmission in light of the heavy network load at the currently scheduled time for transmission.

Moreover, the monitoring module 208 is configurable to identify any other pattern 238 that may be instrumental in determining issues with a current data file transmission and/or may otherwise benefit or optimize future data file transmissions.

The memory 208 of apparatus 200 additionally includes issue determining module 218 that is configured to determine one or more issues 220 associated with a current (including pending or scheduled) data file transmission 222 based, at least in part, on a comparison of the information 226 associated with one or more patterns 212 to parameters 224 associated with current data file transmissions 222. An "issue" is any deviation from the "norm" (as defined in the pattern) or scheduled timing 240 that may delay a data file transmission or prevent a data file transmission from occurring. As such, in addition to the comparison to the information 226 associated with the pattern(s) 212, the issue determining module 218 may rely on other data (such as scheduled times, service level agreements and the like) in determining whether or not an issue exists.

As previously noted, issue determining module 218 may determine issues 220 in any pre-processing/pre-transmission 242 event associated with the data file and, as such, the issue determining module 218 is configured to monitor the progress of any downstream event that may affect the timing of data transmissions, including but not limited data creations, data retrieval/assembly 244, reformatting/normalizing of data, creation of temp files 246 and the like. Thus, similar, to the monitoring module, the issue determining module 218 may be system-agnostic, platform-agnostic, application-agnostic and/or protocol-agnostic, such that the issue determining module 218 is capable of monitoring any downstream application/service regardless of the system, platform, application or protocol implemented by the downstream application/service. In other embodiments of the invention, the issue determining module 218 is capable of determining issues associated with post-transmission processing (i.e., post-transmission) that occur prior to receipt of the data file by the designated recipient.

Additionally, the memory 208 of apparatus 200 stores alert module 228 that is configured to generate and initiate electronic communication of alerts 230 to designated recipient entities 232 that notify the recipient of the issue. In specific embodiments of the invention, the designated entities are entities and/or individuals within the sender/file transmitting entity. In such embodiments, the alert serves to notify the recipient of the issue and prompts the recipient to conduct necessary actions to mitigate the issue or otherwise correct the issue. In other embodiments of the invention, the designated entities include entities and/or individuals within the recipient/file receiving entity. In such embodiments of the invention, the alert may serve to notify the entity of the issue, e.g., the file transmission has been delayed and/or will not be received at this time.

Since the issue determining module 218 is configured to determine issues prior to data file transmission and/or prior to the normal or scheduled time for data file transmission, the alert module 228 is configured to generate and initiate communication of alerts 230 prior to the normal/scheduled transmission time 248. This means that remedial/corrective actions may be taken pro-actively, prior to the normal or scheduled time for data file transmission to mitigate the delay and/or eliminate/correct any delay in transmission and/or mitigate/correct data file deficiencies prior to the schedule transmission time. Moreover, in other embodiments in which the issue is determined after data file transmission or for other reasons (e.g., severity of the issue, lack of resolution/remedial action), the alert module 228 may be configured to generate and initiate communication of alerts 230 after the transmission of the data file 250 (i.e., prior to or after receipt by the recipient).

Moreover, the alert module 228 herein described is a highly intelligent alert module that is configured to dynamically determine different aspects of the alerts, including the recipients 252, the timing 254 (i.e., when to send and how long between continual alerts) of alerts, the content 256 of alerts and/or whether a response/action has occurred 258 for the purpose of determining whether further alerts 230 are warranted. In specific embodiments of the invention, dynamic recipient determination 252 may be based on (i) the type and/or severity of the issue and/or (ii) the length of delay in transmitting or receiving the data file and/or the (iii) the lack of a response indicating remedial action has been taken. For example, the type or severity of the issue may dictate that certain entities receive the alert. In another example, a first level of recipients may receive the alert first and, if the transmission delay persists, a second level of recipients may receive the alert and so on. In yet another example, failure to receive a response and/or confirmation of remedial corrective action within a predetermined period of time may prompt communication of the alert to a second entity or second level of recipients.

In terms of dynamic timing determination 254 more frequent alerts may be sent to the same recipient based failing to respond to an alert. For example, after five minutes of no response, the recipient may be sent a second alert and, after three minutes of no response to the second alert, a third alert may be sent and so on. Moreover, the type of issue or severity of the issue may dictate how frequent further alerts are sent. For example, a certain type or severe issue may prompt alerts to be sent every two minutes, while another type or less sever issue may prompt alerts to be sent every ten minutes.

Additionally, in terms of dynamic content determination 256 the type or severity of issue and/or the designated recipient may dictate the content of the alert (i.e., how the issue is conveyed to the recipient. For example, if the issue is of less severe type the alert may be solely informative and not include many details; however; if the issue is of a more severe type the alert may include specific details of the issue and require the recipient to respond/remediate the issue. Moreover, if the designated recipient is a technical background recipient the alert will contain more technical content related to the issue, while if the designated recipient is of a business background the alert will contain less technical content.

Figure 4:
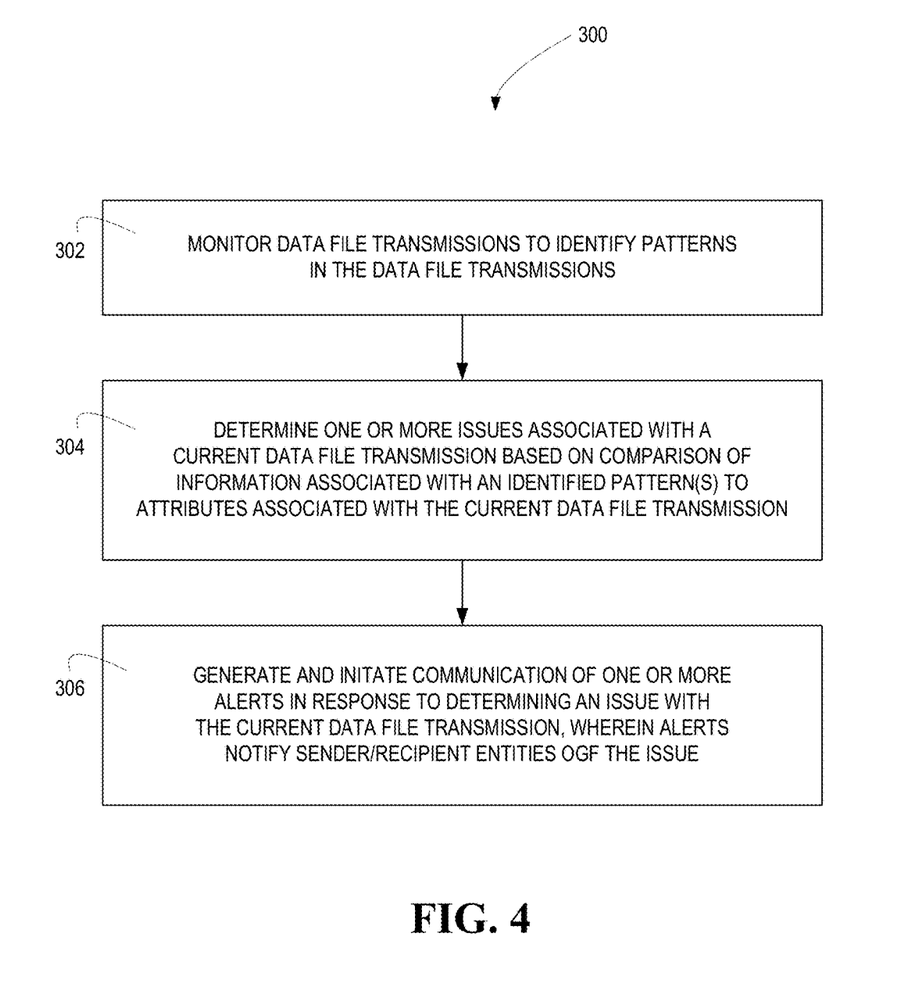
FIG. 4 provides a flow diagram of a method for determination and notification of issues associated with the transmission of a data file, in accordance with embodiments of the present invention.

Referring to FIG. 4 a flow diagram is presented of a method 300 for automated validation of evidence in a change process associated with an authorized data source determination and notification if issues in data file transmissions, in accordance with specific embodiments of the present invention.

At Event 302, data file transmissions are monitored to identify, typically via heuristic techniques or the like, patterns in the data file transmissions. As previously discussed, such monitoring may include any pre-processing/pre-transmission event or downstream event, including, but not limited to, and events associated with producing the data items included in the data file, assembling/retrieving the data items, normalizing/re-formatted the data items, creating a temporary file prior to transmission and the like. Moreover, according to other specific embodiments of the invention, monitoring may include and post-processing/post-transmission event that is accessible to the application performing the monitoring. Patterns may comprise any observed behaviors in any downstream and/or upstream event associated with the data file transmission process.

At Event 304, one or more issues are determined, typically via heuristic techniques or the like, for a current data file transmission based, at least in part, on a comparison between information associated with one or more of the patterns and parameters associated with a current data file transmission. Monitoring of any and, in some instances all pre (downstream) and post (upstream) processing of the data file is necessary to determine the parameters, i.e., timing, file size, content and the like, associated with the current data file. An issue may be defined as a deviation between the patterns and the current data file transmission process. The level of deviation required for the deviation to rise to an issue may be dynamic in nature, depending on conditions of the file, the network and the like, at or proximate to the time of the normal/scheduled transmission.

At Event 306, in response to determining an issue, an alert is generated and communication is initiated to one or more designated recipients. The alert will notify the recipient of the issue and, in some embodiments, prompt the recipient to set requisite remedial/corrective actions in motion. As previously discussed the alert may be highly dynamic in nature with different factors affecting the timing of the alerts, the recipients of the alerts and/or the content of the alerts.

Thus, systems, apparatus, methods, and computer program products described above provide for monitoring data file transmissions to determine patterns in data file transmissions and determining issues in a current data file transmission by comparing information associated with the patterns to attributes associated with the current data file transmission. In response to determining issues, dynamic alerts are generated and communicated to designated parties that notify the designated parties of the issues and prompt remedial actions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for determining one or more issues associated with data file transmissions and generating alerts in response to determining an issue, the apparatus comprising:
    a computing platform having a memory and at least one processor in communication with the memory; and
    a data file transmission monitoring module stored in the memory, executable by the processor and configured to:
        continuously monitor data file transmissions between at least one sender entity and at least one recipient entity to:
            identify patterns in the data file transmissions, wherein the identified patterns include timing parameters, data file parameters, and timing related network parameters associated with the data file transmissions; and
            identify trends in the data file transmissions, wherein the identified trends are associated with timing of the data file transmissions;
    an issue determining module stored in the memory, executable by the processor and configured to continuously monitor each of the data file transmissions to:
        determine type of a current transmission of a data file;
        compare information associated with at least one of the identified patterns to attributes of the current transmission of the data file;
        identify a level of deviation from a norm based on comparing the information associated with at least one of the identified patterns to the attributes of the current transmission of the data file, wherein the norm is defined based on the identified patterns;
        determine one or more issues associated with the current transmission of the data file based on the identified level of deviation and the type of the current transmission of the data file; and
        reallocate one or more resources based on the identified trends to resolve the one or more issues, wherein reallocating the one or more resources comprises at least increasing a number of resources or assigning a new resource to complete the current transmission of the data file;
    an alert module stored in the memory, executable by the processor and configured to:
        dynamically determine one or more recipients in response to the issue determining module determining the one or more issues with the current transmission of the data file, wherein the one or more recipients are associated with the at least one recipient entity or the at least one sender entity associated with the current transmission of the data file; and
        generate and initiate communication of one or more alerts associated with the one or more issues of the current transmission of the data file to the one or more recipients.

2. The apparatus of claim 1, wherein the issue determining module is configured to determine the one or more issues associated with pre-processing of the data file prior to transmission of the data file.

3. The apparatus of claim 2, wherein the issue determining module is further configured to determine the one or more issues associated with creating a temporary version of the data file prior to transmission of the data file.

4. The apparatus of claim 2, wherein the alert module is further configured to generate and initiate communication of the one or more alerts prior to a scheduled time for transmission or receipt of the data file based on determining the one or more issues associated with the pre-processing of the data file.

5. The apparatus of claim 1, wherein the data file transmission monitoring module is further configured to monitor the data file transmissions to identify the patterns in the data file transmissions, wherein the patterns define the timing parameters associated with a specific recurring data file transmission.

6. The apparatus of claim 5, wherein the issue determining module is further configured to determine the one or more issues associated with timing of the current transmission of the data file that may delay or prohibit the data file from being transmitted to or received by a designated entity.

7. The apparatus of claim 1, wherein the alert module is further configured to generate and initiate communication the one or more alerts, wherein the one or more alerts are generated and communicated prior to a scheduled time for receipt or transmission of the data file or after the scheduled time for receipt or transmission of the data file.

8. The apparatus of claim 5, wherein the alert module is further configured to progressively generate and initiate communication of the one or more alerts to different levels of recipients within the at least one sender entity or the at least one recipient entity, wherein each level is associated with a longer period of delay in transmitting or receiving the data file.

9. The apparatus of claim 1, wherein the alert module is further configured to determine a timing for generating and initiating communication of the one or more alerts based on at least one of (i) a type of issue associated with the current transmission of the data file that may prevent or delay the data file from being received by a designated entity, and (ii) a designated recipient of one of the one or more alerts.

10. The apparatus of claim 1, wherein the alert module is further configured to determine alert content for the one or more alerts based on at least one of (i) type of issue associated with the current transmission of a data file that may prevent or delay the data file from being received by a designated entity and (ii) a designated recipient of one of the one or more alerts.

11. The apparatus of claim 1, wherein the alert module is further configured to determine one or more recipients for receiving the one or more alerts based on at least one of (i) a type of issue associated with the current transmission of the data file that may prevent or delay the data file from being received by a designated entity and (ii) a length in delay in transmitting or receiving the data file.

12. The apparatus of claim 1, wherein the alert module is further configured to progressively generate and initiate communication of the one or more alerts to different levels of recipients within a sender entity or a recipient entity, in response to a level of recipients failing to respond to the determined the one or more issues.

13. The apparatus of claim 1, wherein the alert module is further configured to generate and initiate communication of the one or more alerts, wherein at least one of the one or more alerts notifies the recipient entity or the sender entity of an alternative time for scheduling transmission of future data file transmissions.

14. A computer-implemented method for determining one or more issues associated with data file transmissions and generating alerts in response to determining an issue, the method comprising:

provideing a computing system comprising a computer processing device and a non-transitory computer readable medium, where the computer readable medium comprises configured computer program instruction code, such that when said instruction code is operated by said computer processing device, said computer processing device performs the following operations:

continuously monitoring data file transmissions between at least one sender entity and at least one recipient entity to identify (i) patterns in the data file transmissions, wherein the identified patterns include timing parameters, data file parameters, and timing related network parameters associated with the data file transmissions, and (ii) trends in the data file transmissions, wherein the identified trends are associated with timing of the data file transmissions;

determining type of a current transmission of a data file;

comparing information associated with at least one of the identified patterns to attributes of the current transmission of the data file;

identifying a level of deviation from a norm based on comparing the information associated with at least one of the identified patterns to the attributes of the current transmission of the data file, wherein the norm is defined based on the identified patterns;

determining one or more issues associated with the current transmission of the data file based on identified level of deviation and the type of the current transmission of the data file;

reallocating one or more resources based on the identified trends to resolve the one or more issues, wherein reallocating the one or more resources comprises at least increasing a number of resources or assigning a new resource to complete the current transmission of the data file;

dynamically determining one or more recipients in response to the issue determining module determining the one or more issues with the current transmission of the data file, wherein the one or more recipients are associated with the at least one recipient entity or the at least one sender entity associated with the current transmission of the data file; and generating and initiating communication of one or more alerts associated with the one or more issues of the current transmission of the data file to the one or more recipients.

15. The method of claim 14, wherein determining the one or more issues further comprises determining the one or more issues associated with pre-processing of the data file prior to transmission of the data file.

16. The method of claim 15, wherein determining the one or more issues associated with pre-processing of the data file further comprises determining the one or more issues associated with creating a temporary version of the data file prior to transmission of the data file.

17. The method of claim 15, wherein generating and initiating communication of the alert further comprises generating and initiating communication of the one or more alerts prior to a scheduled time for transmission or receipt of the data file based on determining the one or more issues associated with the pre-processing of the data file.

18. The method of claim 14, wherein determining the one or more issues further comprises determining the one or more issues associated with timing of the current transmission of the data file that may delay the data file from being transmitted to or received by a designated entity within a predetermined schedule time for transmission or receipt of the data file.

19. A computer program product for determining one or more issues associated with data file transmissions and generating alerts in response to determining an issue, the computer program product including a non-transitory computer-readable medium having computer readable program code embodied therewith, the computer-readable program code comprising:

a first set of codes for causing a computer to continuously monitor data file transmissions between at least one sender entity and at least one recipient entity to identify (i) patterns in the data file transmissions, wherein the identified patterns include timing parameters, data file parameters, and timing related network parameters associated with the data file transmissions, and (ii) trends in the data file transmissions, wherein the identified trends are associated with timing of the data file transmissions;

a second set of codes for causing a computer to determine type of current transmission of a data file;

a third set of codes for causing a computer to compare information associated with at least one of the identified patterns to attributes of the current transmission of the data file;

a fourth set of codes for causing a computer to identify a level of deviation from a norm based on comparing the information associated with at least one of the identified patterns to the attributes of the current transmission of the data file, wherein the norm is defined based on the identified patterns;

a fifth set of codes for causing a computer to determine one or more issues associated with the current transmission of the data file based on the identified level of deviation and the type of the current transmission of the data file;

a sixth set of codes for causing a computer to reallocate one or more resources based on the identified trends to resolve the one or more issues, wherein reallocating the one or more resources comprises at least increasing a number of resources or assigning a new resource to complete the current transmission of the data file;

a seventh set of codes for causing the computer to dynamically determine one or more recipients in response to the issue determining module determining the one or more issues with the current transmission of the data file, wherein the one or more recipients are associated with the at least one recipient entity or the at least one sender entity associated with the current transmission of the data file; and an eighth set of codes for causing a computer to generate and initiate communication of one or more alerts associated with the one or more issues of the current transmission of the data file to the one or more recipients.

20. The computer program product of claim 19, wherein the fifth set of codes is further configured to cause the computer to determine the one or more issues associated with pre-processing of the data file prior to transmission of the data file.

* * * * *